United States Patent [19]
Graff et al.

[11] Patent Number: 5,796,856
[45] Date of Patent: Aug. 18, 1998

[54] GAP MEASURING APPARATUS AND METHOD

[75] Inventors: Ernest A. Graff, Ontario; Dan S. Albright, Rochester, both of N.Y.

[73] Assignee: Eastman Kodak Company, Rochester, N.Y.

[21] Appl. No.: 835,555

[22] Filed: Apr. 8, 1997

Related U.S. Application Data

[63] Continuation of Ser. No. 296,048, Aug. 24, 1994, abandoned.

[51] Int. Cl.$^6$ .................................................. G06K 9/00
[52] U.S. Cl. ........................... 382/108; 250/901; 382/266
[58] Field of Search ................................. 382/108–109, 382/144, 152, 199, 266; 250/901; 118/414

[56] References Cited

U.S. PATENT DOCUMENTS

| | | | |
|---|---|---|---|
| 3,996,885 | 12/1976 | Jackson et al. | 118/50 |
| 4,520,504 | 5/1985 | Walker et al. | 382/100 |
| 4,736,159 | 4/1988 | Shiragasawa et al. | 382/145 |
| 4,817,174 | 3/1989 | Nakatani | 382/199 |
| 4,821,544 | 4/1989 | Tamler et al. | 72/16 |
| 4,939,378 | 7/1990 | Joannes et al. | 250/560 |
| 5,231,675 | 7/1993 | Sarr et al. | 382/152 |
| 5,255,199 | 10/1993 | Barkman et al. | 382/152 |
| 5,340,992 | 8/1994 | Matsugu et al. | 250/548 |
| 5,384,717 | 1/1995 | Ebenstein | 382/199 |
| 5,390,108 | 2/1995 | Baldur et al. | 382/108 |
| 5,422,958 | 6/1995 | Wouch et al. | 382/141 |
| 5,463,697 | 10/1995 | Toda et al. | 382/199 |

FOREIGN PATENT DOCUMENTS 92 06455  8/1993  France.

*Primary Examiner*—Yon J. Couso
*Assistant Examiner*—Jayanti K. Patel
*Attorney, Agent, or Firm*—Arthur H. Rosenstein

[57] ABSTRACT

An apparatus and method to measure a gap width distance, specifically the distance between the lip of a coating hopper and the tangential edge of a coating roller or the support on the roller, is disclosed herein. The apparatus includes a long range microscope coupled with a CCD camera to provide a computer with an image. From this image the computer calculates first and second derivatives of the light intensity values between each pixel and determines the pixel locations of the two edges.

8 Claims, 2 Drawing Sheets

GAP MEASURING APPARATUS AND METHOD

This is a Continuation of application Ser. No. 08/296,048, filed 24 Aug. 1994 now abandoned.

FIELD OF INVENTION

The present invention relates to setting the gap width distance between a coating hopper and a coating roller, which supports a moving web. More particularly, the present invention concerns an apparatus and a method to provide an absolute, real-time measurement of the gap width distance between the coating hopper and coating roller without physical contact.

BACKGROUND OF THE INVENTION

The slide bead coater is an example of a coating apparatus, which supplies a liquid to be coated upon a moving support. In this apparatus one or more coating liquids flow down the slide hopper as distinct layers and meet a moving support on a coating roller. A bead is formed at the gap where the slide hopper meets the support.

The hopper gap distance is a crucial parameter for the coating process. Too great a distance will lead to the rupture of the bead, while too small a distance may cause the support to be caught on the lip. The hopper gap can be defined as the distance between the hopper lip and coating roller surface. It may also be defined as the distance between the hopper lip and the support to be coated at the coating roller. The definition is a function of the product being coated.

At most bead coating stations, the hopper gap is adjusted and set by operators using shims before a coating run. The shims are sheets of plastic with different given thicknesses. The use of plastic shims has several disadvantages. Their use is operator dependent, which leads to non-reproducible spacing from coating run to coating run. The operator and the condition of the plastic shim limit the accuracy and precision of setting the gap spacing. Each time the shim rubs against the lip of the hopper the shim dimensions change from the wear. The measurements can only be made when the operator is present, which is before or after coatings. No provision is made for measuring the hopper gap while coating is in progress. The gap width distance varies over time during the coating process due to vibration, expansion of the lip according to temperature, and changes in web tension. Such variations may effect the quality of the coating, cause the support to catch on the lip of the hopper, or cause the coating solution not to bridge the gap.

Another method to measure the distance between the hopper lip and the coating roller is with induction sensors. The induction sensors are proximity sensors, which rely upon an electromagnetic field produced at the sensor to induce an eddy current in a nearby metallic surface. The effective inductance seen by the sensor depends upon the distance between the sensor and the metallic target. The induction sensors indicate changes in position after the hopper gap has been set by some other means and therefore the sensors only provide a relative measurement. This system is limited to relative measurements only at the longitudinal ends of the gap. Due to roller vibration, frequent calibration is necessary to maintain system accuracy.

One alternative has been previously proposed and is disclosed in French patent application 92 06455. This device requires a monochromatic light source to be on one side of the hopper gap with the detector on the reverse side. The detector determines the gap width distance by measuring the diffraction pattern of the light that passes through the hopper gap. This system has the disadvantage of requiring the light source to be beneath the hopper gap, which is a corrosive environment.

The problems identified and solved include a non-intrusive apparatus and method to provide an absolute measurement of a gap width with a high degree of accuracy and precision.

SUMMARY OF THE INVENTION

The present invention includes an optical focusing device, preferably a long range microscope, focused upon the hopper gap between the coating hopper and the coating roller. The hopper gap is illuminated by a source of visible light such that a CCD camera coupled with the focusing device captures an image of the hopper gap. A computer processes the image in real-time by digitizing the image and assigning each pixel a light intensity value. An array of average values is created and the first and second derivatives of the light intensity values are used to determine the location of the hopper lip and the tangential edge of the coating roller. Both the light source and the optical system are positioned on the same side of the hopper gap.

The present invention has several advantages over the prior art. The measuring apparatus provides an absolute real-time measurement rather than a relative measurement of the gap width distance. One or more optical systems can measure the full gap length with a high degree of accuracy and precision. Both the light source and the optical system are located above the coating apparatus to improve the safety and the physical integrity of the system, since beneath the apparatus there is the risk of contact by the electrical components with water and corrosive chemicals. Additionally, both the light source and the optical system may be located above the hopper gap by three feet, which is outside the zone for hazardous volatile solvents and out of the way of working operators.

For a better understanding of the present invention together with other objects, advantages and capabilities thereof, reference is made to the following description and appended claims in connection with the above described drawings.

DETAILED DESCRIPTION OF THE INVENTION

Figure 1:
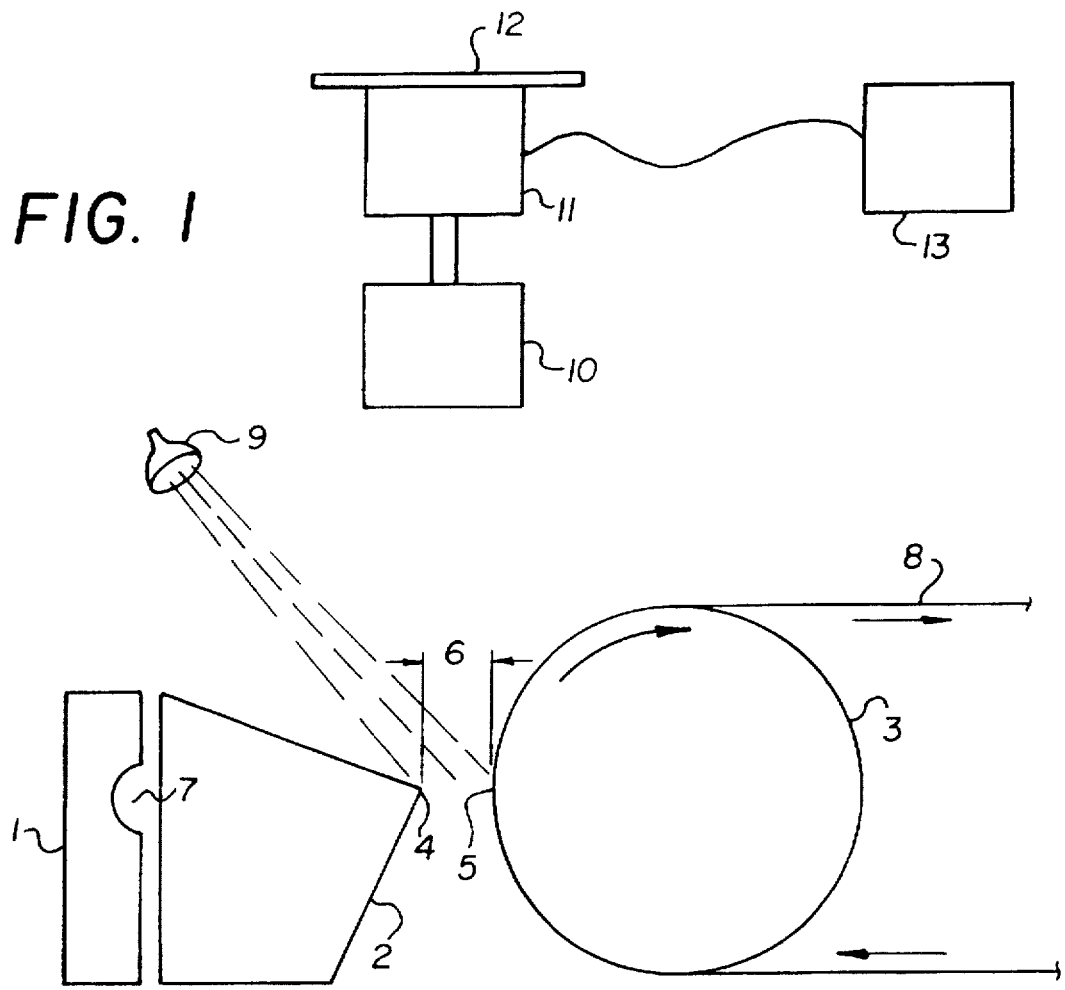
FIG. 1 is a sectional view of a coating device using at least one measuring apparatus.

FIG. 1 shows a side view of a coating hopper with a hopper gap measuring device. The hopper is comprised of adjoining hopper elements 1,2. The hopper elements 1,2 fit together in a manner to create a metering slot 7 through which the liquid to be coated flows. The liquid is coated upon the support 8, which is carried by the coating roller 3. The hopper lip 4 and the coating roller 3 are spaced apart to create a gap 6. The hopper is horizontally adjustable to place the hopper lip 4 in fixed relation to the tangential edge 5 of the coating roller 3. The gap 6 is set wide enough to allow free passage of the support 8 and set narrow enough to allow the liquid flowing from the metering slot 7 to bridge the gap 6 and coat the support 8.

Figure 2:
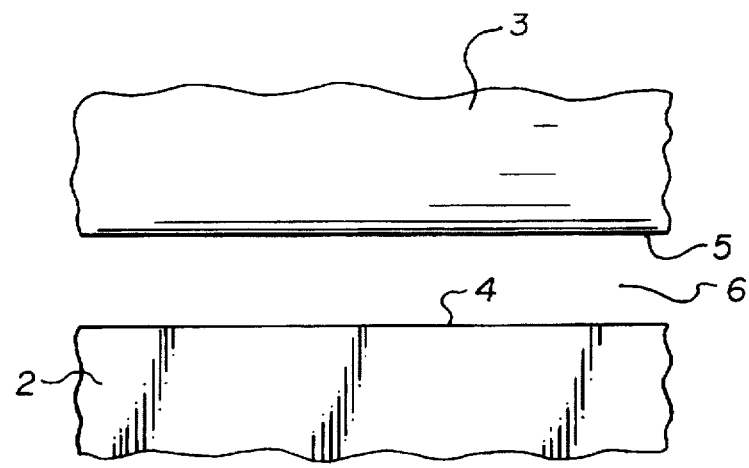
FIG. 2 is a schematic of the hopper gap image as viewed by the measuring apparatus of the present invention.

A light source 9 is mounted above the hopper and illuminates the gap 6. The light reflects from the hopper lip 4 and the coating roller 3. The image is focused by the long range microscope 10 for the CCD camera 11. The long range microscope 10 is on a track 12 positioned above the gap 6. The track 12 is in a plane parallel to an X-Y plane created by the tangential edge 5 of the coating roller 3 and the hopper lip 4. FIG. 2 is a schematic of the hopper gap image as viewed by the optical system.

The image signal from the CCD camera 10 is processed by a computer 13. The computer 13 digitizes the image of the hopper gap 6 and assigns light intensity values to the discrete points. The computer 13 then samples several columns of pixels from the digitized image to create an array of pixels with the rows aligned. The array of pixels is averaged row by row to create a single array of light intensity values. This process compensates for distortions in the image of the edge of the coating hopper 2 and the coating roller 3 created by dust and/or imperfections.

FIG. 2 illustrates the contrast levels between the coating roller 3 and the coating hopper 2 in an image created by the CCD camera 11. A multitude of algorithms exist, which may be used to determine edge locations. To find the edge of the coating hopper 2, the hopper lip 4, the computer 13 applies an algorithm, which determines the first derivative of the light intensity value between each pixel and its neighbor and then searches for extrema: maximums, minimums and inflection points. Since the coating hopper 2 has a hopper lip 4, which creates a high contrast between the hopper 2 and the hopper gap 6, the pixel location can be determined by locating an absolute maximum. Since the coating roller 3 has a curved surface, which reflects light at various angles, the contrast is poor and the absolute minimum is not an accurate representation of the roller's tangential edge 5. The computer 13 must apply a second algorithm to determine the second derivative of each pixel and then search for a local minimum. The pixel locations of the second derivative local minimum and the first derivative minimum are combined to determine the position of the roller tangential edge 5. The pixel difference between the roller tangential edge 5 and the hopper lip 4 of the coating hopper 2 is the calculated gap 6 width measurement. The preferred embodiment of the invention comprises two optical systems, since the gap width distance must be measured at a minimum of two locations along the gap length.

Since the optical system magnification varies with distance from the system to the object, the system must be calibrated for the working distance, the distance between the hopper gap 6 and the front element of the long range microscope 10, and a conversion factor of inches (object plane) per pixel (image plane) calculated. The magnification can be accurately calculated by locating the hopper lip 4 of the coating hopper 2 and positioning the system 10,11 such that the hopper lip 4 is near the bottom of the image. The system 10,11 is moved 0.1 mm at a time along a track 12 following the Y-axis in a plane parallel to the X-Y plane of the hopper gap 6. At each point the pixel location of the coating hopper edge 4 is recorded and plotted versus the distance moved. An example is FIG. 3. The slope of this plot is the conversion factor. Recalibration is necessary each time the working distance changes.

Example 1
Measurement System Calibration

The optical system included a Questar QM-1 long range microscope, a Javelin JE2062IR CCD camera and a white light source. A long range microscope is available from a number of manufacturers including Infinity and Questar. The Javelin CCD camera created a 512×512 pixel image. A CCD camera is available from a number of manufacturers including Dage-MTI, Hitachi, Javelin, Pulnix, and Sony. A PCVISIONplus frame grabber digitizes the CCD camera images. A frame grabber is available from a number of manufacturers including Data Translation, DIPIX, Imaging Technology, Matrox, and PCVISION. An HP Vectra 486 PC processes these images to locate the pixel positions of the knife edge of the hopper and the tangential edge of the coating roller.

The precision of the measurement system is demonstrated by multiple calibrations at the same working distance. These calibrations were conducted by manually moving the translation stage the 0.1 mm per measurement. Using a working distance of approximately three feet, the following conversion factors were calculated by a linear regression routine:

TABLE I

| | |
|---|---|
| First Trial | 0.000574555 cm/pixel |
| Second Trial | 0.000574654 cm/pixel |

Figure 3:
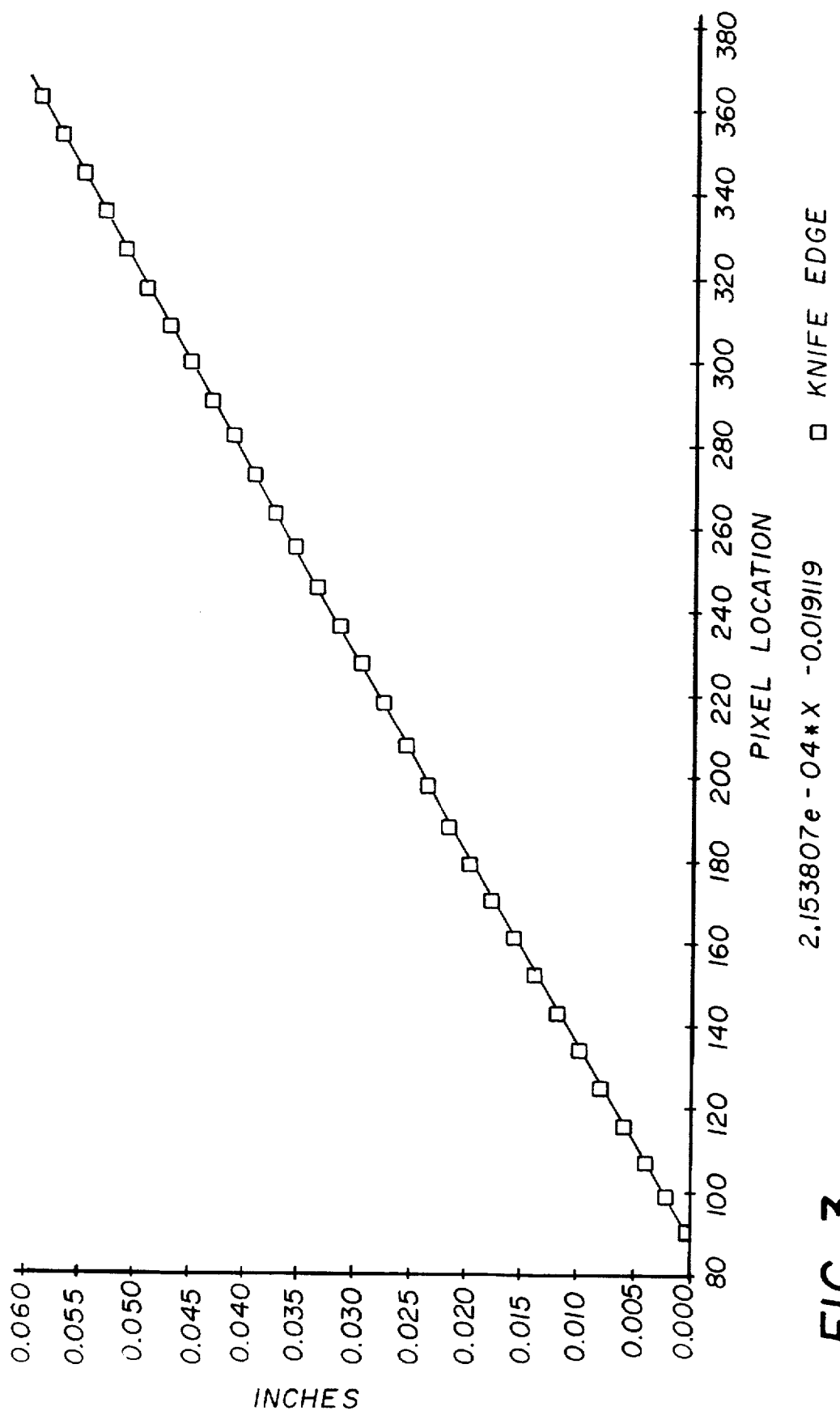
FIG. 3 is a plot of the calibration data using the measuring apparatus of the present invention.

Difference between the trials was 9.9E-08 cm/pixel. At the same working distance a hopper gap width of 0.0254centimeters has a measured hopper gap width of approximately 44.2 pixels. Thus for a 0.0254 hopper gap, the variation is 4.4E-06 centimeters, 0.017%. FIG. 3 is an example of a plot of the data collected for the regression routine.

Example 2
Gap Measurement

To test the accuracy of the measurement system, different gap widths were measured using various sized spacer blocks. The spacer blocks were rectangular Grade Two Tungsten Carbide spacer blocks from A.A. Jansson. The working distance was approximately three feet. The gap measuring system as described above in Example 1 was used.

TABLE II

| Actual Gap (mm) | Measured Gap (mm) |
|---|---|
| 0.254 | 0.2527–0.2553 |
| 0.295 | 0.2908–0.2934 |
| 0.305 | 0.3023–0.3048 |
| 0.371 | 0.3696–0.3721 |

In an alternate embodiment, a single optical system 10,11 is mounted on a translation stage 12, such that the optical system 10,11 can be moved in X and Y directions along a plane parallel to the X-Y plane of the hopper gap 6. This embodiment allows for a single system 10,11 to measure the gap width distance 6 at one or more locations along the length of the hopper gap 6 before and after a coating run. Positioning the stage 12 in a parallel plane establishes the working distance, such that recalibration is not required as the stage 12 moves.

In another alternate embodiment, the light source 9 may be infrared to allow the CCD camera 11 to capture an image in a dark environment. This embodiment allows a system 10,11 to measure the gap width distance 6 at the ends, which would otherwise be impossible during light sensitive operations such as the production of photographic products.

In yet another alternate embodiment, the single optical system 10,11 on a translation stage 12 is combined with the infrared light source 9. This embodiment allows gap width 6 measurements before, during, and after the coating run as well as on-line monitoring of the coating operation process. The system 10,11 can take measurements at the ends or at any point along the length of the hopper gap 6.

Each of the above embodiments is applicable to an apparatus where the measurement to be made is of the gap between a coating hopper and a support on a coating roller rather than between the coating hopper and the coating roller. For the coating of a paper support this is the preferred measurement.

While there has been shown and described what are at present considered the preferred embodiments of the invention, it will be obvious to those skilled in the art that various changes, alterations and modifications may be made therein without departing from the scope of the invention as defined by the following claims.

What is claimed is:

1. An apparatus for measuring a distance, comprising:
  a) a coating hopper;
  b) a coating roller spaced apart from said coating hopper to form a gap;
  c) a light source located above said gap for illuminating the gap between the coating hopper and the coating roller;
  d) an optical focusing device positioned away from the gap comprising a long range microscope and positioned above said gap;
  e) a CCD camera coupled to said optical focusing device, said CCD camera generating an image signal of the gap between the coating hopper and the coating roller;
  f) a computer for processing the image signal by:
    i) digitizing the image signal into a series of discrete points;
    ii) assigning intensity values to the series of discrete points;
    iii) creating a plurality of arrays of the intensity values and then creating an array of the averages wherein the computer samples columns of pixels from the digitized image to create an array of pixels with aligned rows, the array of pixels being averaged row by row to create a single array of light intensity values;
    iv) determining an edge location of the coating hopper by a first derivative of the light intensity value between each pixel from the digitized image and an edge location of the coating roller by a first and second derivative of the said array of averages wherein the computer applies an algorithm which determines the first and second derivatives of the light intensity values between each pixel and its neighbor and searches for extrema: maxima, minima and inflection points;
    v) determining the distance between the edge of the coating hopper and the edge of the coating roller.

2. The apparatus according to claim 1 wherein said light source is infrared light.

3. The apparatus according to claim 1 wherein said light source is visible light.

4. The apparatus according to claim 1 further comprising a translation stage for moving said imaging device along a X-Y plane parallel to the gap between the coating hopper and the coating roller.

5. An apparatus for measuring a distance, comprising:
  a) a coating hopper;
  b) a support on a coating roller spaced apart from said coating hopper to form a gap;
  c) a light source for illuminating the gap between the coating hopper and the support;
  d) a long range microscope positioned away from and above the gap;
  e) a CCD camera coupled to said long range microscope, said CCD camera generating an image signal of the gap between the coating hopper and the support;
  f) a computer for processing the image signal by:
    i) digitizing the image signal into a series of discrete points;
    ii) assigning intensity values to the series of discrete points;
    iii) creating a plurality of arrays of the intensity values and then creating an array of the averages wherein the computer samples columns of pixels from the digitized image to create an array of pixels with aligned rows, the array of pixels being averaged row by row to create a single array of light intensity values;
    iv) determining an edge location of the coating hopper by a first derivative of the light intensity value between each pixel from the digitized image and an edge location of the support by a first and second derivative of the said array of averages wherein the computer applies an algorithm which determines the first and second derivatives of the light intensity values between each pixel and its neighbor and searches for extrema:maxima, minima and inflection points;
    v) determining the distance between the edge of the coating hopper and the edge of the support.

6. The apparatus according to claim 5 wherein said light source is infrared light.

7. The apparatus according to claim 5 wherein said light source is visible light.

8. The apparatus according to claim 5 whereby a translation stage moves said long range microscope along a X-Y plane parallel to the gap between the coating hopper and the support on the coating roller.

* * * * *